June 9, 1964   F. KÄRGER ETAL   3,136,169
AUTOMATIC CHAIN TIGHTENING MECHANISM FOR
INFINITELY VARIABLE CONE PULLEY GEARS
Filed April 13, 1962   6 Sheets-Sheet 1

INVENTOR.
Fritz Kärger
Carl Gausmann
BY
Bailey, Stephens & Huettig
ATTORNEYS

INVENTOR.
Fritz Karger
Carl Gausmann

June 9, 1964    F. KÄRGER ETAL    3,136,169
AUTOMATIC CHAIN TIGHTENING MECHANISM FOR
INFINITELY VARIABLE CONE PULLEY GEARS
Filed April 13, 1962    6 Sheets-Sheet 5

Fritz Kärger   INVENTOR.
Carl Gaussn
BY
Bailey, Stephens & Huettig

ATTORNEYS

June 9, 1964    F. KÄRGER ETAL    3,136,169
AUTOMATIC CHAIN TIGHTENING MECHANISM FOR
INFINITELY VARIABLE CONE PULLEY GEARS
Filed April 13, 1962      6 Sheets-Sheet 6

INVENTOR.
Fritz Karger
Carl Gausmann
BY
Bailey, Stephens & Huettig
ATTORNEYS

United States Patent Office 3,136,169
Patented June 9, 1964

3,136,169
AUTOMATIC CHAIN TIGHTENING MECHANISM FOR INFINITELY VARIABLE CONE PULLEY GEARS
Fritz Kärger, Bad Homburg vor der Höhe, and Carl Gausmann, Oberursel, Taunus, Germany, assignors to Reimers Getriebe K.G., Ascona, Switzerland, a firm of Switzerland
Filed Apr. 13, 1962, Ser. No. 187,238
Claims priority, application Germany Apr. 19, 1961
12 Claims. (Cl. 74—230.17)

The present invention relates to a mechanism for automatically tightening the endless driving belt or chain of an infinitely variable cone pulley transmission, in which the belt or chain running between two pairs of conical pulley disks which are adjustable relative to each other in opposite axial directions by means of control levers may be tightened by means of a spindle which carries the control levers and permits the distance between the conical disks of each pair to be adjusted in the same direction.

In infinitely variable transmissions of the above-mentioned type it is necessary to maintain the tension of the belt or chain as uniform as possible during the entire working life of the gear since otherwise the transmission would be damaged in one way or another depending upon its particular design, but usually very seriously. This is true particularly for transmissions which consist entirely of metal and operate with link chains which also consist entirely of metal. Even in such transmissions it occurs that due to the unavoidable wear occurring in the operation of the transmission, the chain tension to which the transmission has been originally adjusted gradually diminishes. In all-metal transmissions with metallic link chains, this is caused primarily by the wear within the chain links. However, also the wear at the points of contact between the chain and the conical disks and at other parts of the transmission results in an increase in the distance between the two conical disks of each pair which also causes a decrease of the original chain tension.

For these reasons it becomes necessary from time to time to readjust the chain tightening means of such transmissions. However, for many different reasons, this is frequently omitted either entirely or it is not done as soon as it is required, one reason being, for example, that such transmissions are often installed in inaccessible places as parts of larger machine units. If such transmissions are of the friction type the loose chain will then slip and thereby destroy the friction surfaces, while in transmissions with toothed chains, the chain segments will be damaged. In very serious cases the chain may loosen to such an extent that it will engage with other components of the transmission and damage the same. In order to avoid these disadvantages, it has already been proposed to employ suitable spring means to act continuously upon the tightening spindle to increase the chain tension. Such a spring is supposed to turn the tightening spindle when the chain tension decreases so that by means of oppositely directed screw threads on the spindle the control levers which are mounted on the spindle will be adjusted in such a manner that the distance between the conical disks of each pair will be reduced. This known mechanism for retightening the chain automatically has, however, certain disadvantages. The adjustment of the parts which are normally stationary depends, on the one hand, upon the force of the spring and, on the other hand, upon the frictional resistances which counteract this spring force. These frictional resistances vary, however, very considerably in accordance with the operating conditions of the transmission and the load to which it is subjected. In addition, there are the changes which are caused by the differences between the frictional resistance at rest and the frictional resistance occurring after the adjusting movement is started, and also between the initial and final tension of the spring, and by the differences in the surface conditions of the threaded and jointed parts. Because of these variable influences the prior apparatus required a relatively strong spring. Such a spring may, however, produce the result that the chain will be tightened too strongly, especially if stronger vibrations occuring during the operation of the transmission annul the frictional resistance at rest. Such a readjustment frequently occurs when the machine is switched off at the end of a period of operation so that the torque on the transmission decreases and the frictional resistance diminishes which is produced by the wedging effect of the chain. An excessive chain tension is, however, of great disadvantage when the transmission is again started. It is a further disadvantage that a spring which is intended to last for the entire life of a transmission for maintaining the chain under a sufficient tension will generally be excessively large and heavy. A smaller spring, on the other hand, would have to be retightened from time to time and such a spring would therefore only reduce but not eliminate the need for service of the transmission at certain times.

It is an object of the present invention to provide a mechanism for automatically tightening a belt or chain of an infinitely variable transmission of the above-mentioned type which overcomes all of the deficiencies and disadvantages of the known automatic belt or chain tightening mechanisms as described above.

Since the invention is applicable either to endless chains or endless belts of any suitable materials, although chains are preferably used in transmissions of this type, both types of driving means are for simplicity's sake meant to be included in the term "chain" as hereafter used.

For attaining the above-mentioned object, the invention provides that the operation of retightening the chain of a gear of the type as described, which becomes necessary from time to time in order to maintain the chain tension as uniform as possible during the operation of the transmission, be instigated by a change in the relative position of certain elements of the transmission, which change, in turn, is dependent upon the prevailing tension of the chain.

In transmissions in which the force of a spring is constantly exerted upon the tightening spindle in order to increase the chain tension, the invention may be very advantageously applied by automatically retightening the spring from time to time. This retightening operation may then again be effected by certain elements, the relative position of which is dependent upon the prevailing tension of the chain. In both cases, the mechanism for retightening the chain may either be temporarily driven by moving elements of the transmission or by an auxiliary force which becomes effective as the result of the change in the relative position of certain transmission elements which occurs when the chain tension decreases beyond a certain limit. In the first-mentioned case in which the transmission is provided, for example, with tension shoes which slide under spring pressure along the chain stringer, a very advantageous embodiment of the invention consists in applying one of the tension shoes upon the loose chain stringer so as to move the latter when the chain tension decreases into frictional engagement with a friction drum which is thereby turned and then acts upon the tightening spindle to effect the required retightening operation. The friction drum which is thus driven by the chain is preferably connected to the tightening spindle by means of a reduction gear so that the tightening spindle will be driven at a rate of speed which is considerably lower than that of the friction drum. Because of this reduction gear, the forces required to act upon the peripheral surface of the friction drum in order to rotate the same only need to be very small, while at the appliction of a strong torque, the tightening spindle will be driven sufficiently slow. In order to insure that the chain will be retighened regardless of whether it is running in one direction or the other, the invention further provides the reduction gear with an automatically acting clutch which is designed so that, in either direction of rotation of the friction drum, the gear will act upon the tightening spindle so as to effect an increase in the chain tension. A very advantageous and space-saving constructon of this friction drum in which a mechanical converter for'converting the movements in opposite directions into only one direction and a high reduction gear are built in is attained by designing the friction drum which is mounted on the tightening spindle so as to be rotatable but not axially slidable relative thereto so as to form the planet carrier of a planetary gear, the planet pinions of which mesh with a gear which forms one of the sun wheels of the planetary gear and is rotatably but nonslidably mounted on the tightening spindle and nonrotably connected to the main gear housing. The planet pinions also mesh with two further gears which together form the other sun wheel and are mounted on the tension spindle so as to be nonslidable thereon but freely rotatable in the same direction by means of clutch members. One of these two gears has a slightly smaller number and the other gear a slightly larger number of gear teeth than the first sun wheel. The hub of the first sun wheel may then be made in the form of a hollow shaft which surrounds the tightening spindle and is slidably connected to one of the tension blocks which are mounted on the tightening spindle and carry the control levers of the transmission.

Another embodiment of the automatic chain tightening mechanism according to the invention which is likewise intended for transmissions in which tension shoes are provided which are slidable under spring pressure on the chain stringers comprises a ratchet gear which is mounted on the tightening spindle and is operatively connected with a driving element which is actuated by one of the transmission shafts when the levers carrying the tightening shoes are displaced as the result of a decreasing chain tension. The ratchet gear may consist of a pawl and ratchet device in which the pivotable pawl carrier engages under the action of a spring against a stop member, the position of which, when the chain tension decreases, is controlled by the tension-shoe levers in such a manner that the pawl carrier will be moved by a spring into the range of operation of a push rod which is mounted on and reciprocated by one of the transmission shafts. The mechanism may, however, also be so designed that for driving the ratchet gear, a push rod is employed which is connected to a spring-loaded snap-action switch which is actuated by at least one of the tension-shoe levers. When the snap-action switch is released when the chain tension has decreased to a certain extent, the push rod will be shifted in its longitudinal direction to such an extent that, by means of a lateral projection thereon, the push rod will engage with and be reciprocated by an eccentric which is mounted on one of the transmission shafts. The driving engagement between the eccentric and the lateral projection on the push rod is then maintained by the spring of the snap-action switch until the switch returns to its original position and thereby disengages the push rod from the eccentric when the chain tension has been sufficiently increased. The push rod of this mechanism may also be provided with a locking member which, when the push rod is not reciprocated by the eccentric, engages into a ratchet wheel which is secured to the tightening spindle and thereby locks the latter and prevents any unintentional rotary movements thereof.

A preferred embodiment of the invention for transmissions in which the conical disks are automatically pressed against the chain, for example, by means of cams in accordance with the torque which is applied upon the transmission, consists of a mechanism in which one member of a friction clutch is connected to the driving gear of a gear unit which is adapted to drive the tightening spindle, while the other member of this friction clutch is secured to one of the conical disks which, when the chain tension decreases, are shifted by the torque-responsive force in their axial direction from their normal position. Thus, when the conical disk which carries the second cltuch member is shifted for a certain distance as the result of the decreasing chain tension, the friction clutch will be engaged which through the gear unit then turns the tightening spindle.

The different embodiments of the automatic chain tightening mechanism according to the invention as previously described may also be easily modified so that the means which are temporarily driven by moving parts of the transmission will not directly produce the adjusting movement of the tightening spindle to reattain the original chain tension, but will rather be used for retightening a spring which constantly acts upon the tightening spindle. Further modifications of such an automatic chain tightening mechanism may be attained by providing an auxiliary force for producing the required adjusting movement of the tightening spindle, rather than by deriving this movement from moving parts of the transmission itself. A very advantageous embodiment of the invention, in which this auxiliary force is provided in the form of a tightened helical spring and in which the transmission is again provided with tension shoes which slide under spring pressure on the two chain stringers may be attained by providing a spring housing which is mounted on the tightening spindle and contains and is acted upon by a helical spring, and by providing this spring housing with an escapement which is connected to the levers carrying the tension shoes in such a manner that it will be released by a displacement of one of the tension shoes resulting from a decrease of the chain tension beyond a certain limit, and that it will be reengaged when the chain has been sufficiently retightened. A mechanism of this type may be very simply designed by providing the spring housing with an escape wheel into which an anchor escapement engages which is controlled by at least one of the tension shoes. If other kinds of auxiliary forces, for example, electric or hydraulic forces, are employed, the mechanism according to the invention may be made of a very simple design by mounting a reciprocating feed or stepping clutch or a ratchet gear on the tightening spindle and by actuating this clutch in a step-by-step movement by connecting it by a rod to an electromagnet or the like, the energizing contacts of which will be closed by one of the gear parts which is displaced when the chain tension decreases beyond a certain limit.

The above-mentioned objects, features, and advantages of the present invention will be more clearly apparent from the following detailed description thereof which is to be read with reference to the accompanying drawings, in which.

Figure 1:
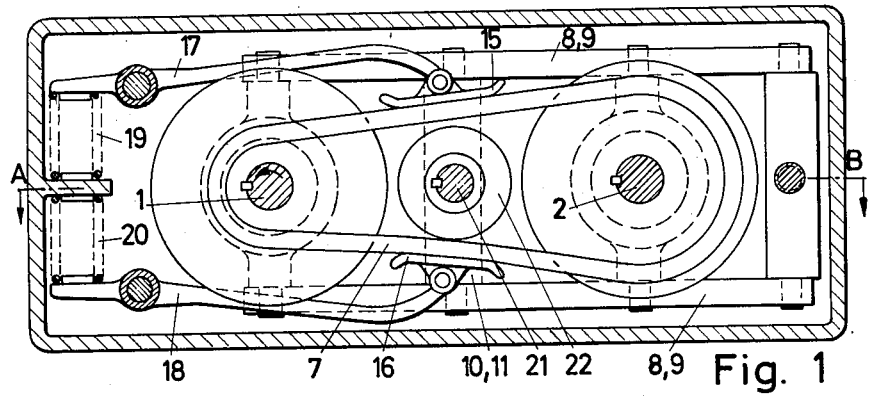
FIGURE 1 shows a diagrammatic longitudinal section taken along line C—D of FIGURE 2 of a transmission which is provided with an automatically acting chain tightening device according to a first embodiment of the invention.
Figure 2:
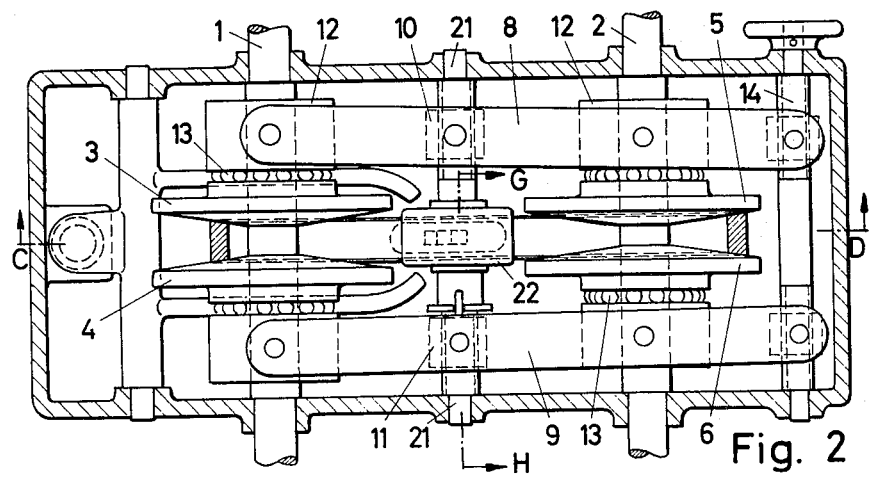
FIGURE 2 shows a cross section taken along line A—B of FIGURE 1.

In the drawings, FIGURES 1 and 2 illustrate an infinitely variable transmission with two transmission shafts 1 and 2 which carry two pairs of conical pulley disks 3, 4 and 5, 6, respectively, which are connected to each other by an endless link chain 7. For varying the transmission ratio of the transmission, the diameters of the chain between the two pairs of conical disks may be adjusted relative to each other by decreasing the distance between the conical disks of one pair by a certain amount and by simultaneously increasing the distance between the disks of the other pair by a corresponding amount. This may be accomplished by means of control levers 8 and 9 which are pivotably mounted on tension blocks 10 and 11 and act through tension rings 12 and thrust ball bearings 13 upon the conical disks to set and vary the relative distance of the disks of each pair from each other. The adjustment of a desired transmission ratio of the transmission is carried out by means of a setting spindle 14 which, when turned, pivots the control levers 8 and 9 in opposite directions about the pivots on the tension blocks 10 and 11. Tension shoes 15 and 16 which are slidable on chain 7 and are pressed by levers 17 and 18 and springs 19 and 20 against the outer side of the chain tighten the latter so as to engage with the conical surfaces of disks 3, 4 and 5, 6 without slipping relative thereto. The tension blocks 10 and 11 carrying the control levers 8 and 9 are provided with screw threads with opposite pitch directions which are screwed on a tightening spindle 21. Thus, by turning the tightening spindle, it is possible to vary the distance between the tension blocks and, if no adjustment is made by the setting spindle 14, also to vary the distance between the conical disks of both pairs 3, 4 and 5, 6 by a movement in the same direction. When the distance between the disks of both pairs is reduced the diameter of chain 7 on both pairs is increased and the chain will thereby be tightened. Such a tightening by an adjustment of tightening spindle 21 becomes necessary from time to time during the operation of the transmission since the tension of the chain as originally set gradually decreases, that is, in the particular transmission as illustrated as the result of an increase in the chain's length due to wear. When such a decrease in the tension of chain 7 occurs, the loose stringer thereof is pressed more and more inwardly by the tension shoe which slides thereon under spring pressure until finally the inner side of the chain engages with a drum 22 which is mounted on tightening spindle 21 and is then taken along by the friction of the moving chain. Drum 22, in turn, then takes along the tension spindle by turning it in the same direction, whereby tension blocks 10 and 11 and thus also the control levers 8 and 9 and disks 3 and 4 as well as 5 and 6 are moved toward each other. The reduction of the distance between the conical disks of both pairs compensates for the lengthening of the chain, the chain is therefore tightened and disengages from drum 22. This completes the automatic chain-tightening operation.

Figure 3:
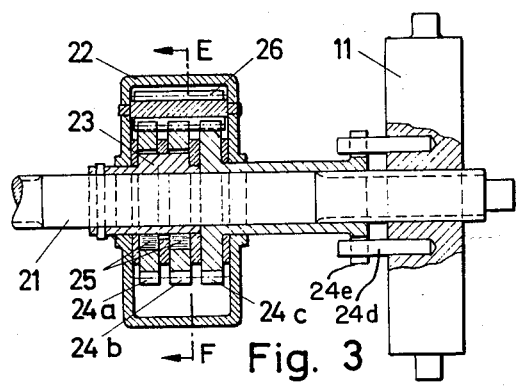
FIGURE 3 shows a partial cross section taken along line G—H of FIGURES 2 and 4.
Figure 4:
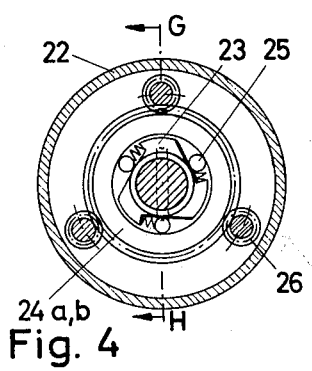
FIGURE 4 shows a cross section taken along line E—F of FIGURE 3.

FIGURES 3 and 4 show the drum 22 which is mounted on tightening spindle 21 in cross section. This drum is connected to the tightening spindle by a reduction gear of such a ratio that a sufficient torque for overcoming the frictional resistance will already be produced when the moving chain merely engages loosely with the peripheral surface of the drum. By means of an expanding friction clutch, the gearing is automatically reversible in such a manner that, at either direction of rotation of drum 22, tightening spindle 21 will be rotated in the required direction to increase the chain tension. For this purpose, the inner member 23 of a double grip roller clutch which is provided with clamping cams is rigidly secured to tightening spindle 21, while the outer members of the clutch are made in the form of gear rings 24a and 24b. Between the outer and inner clutch members, grip rollers 25 are provided. A third gear ring 24c is mounted on the tightening spindle 21 so as to be freely rotatable thereon, but without being able to slide thereon in the longitudinal direction. The three gear rings 24a, 24b, and 24c have slightly different numbers of teeth so that, for example, gear ring 24a has a slightly smaller number and gear ring 24b a slightly larger number of teeth than gear ring 24c. All three gear rings 24a to 24c are constantly in mesh with any desired number of pinions 26 which are rotatably mounted in the side walls of drum 22. Drum 22 is freely rotatable on the tightening spindle or on the hubs of the members 23 and 24c. The hub of gear ring 24c is connected to tension block 11 by pins 24d mounted in block 11 and engaged in notches 24e in the hub so as to be nonrotatable but longitudinally slidable relative thereto.

The manner of operation of this mechanism is as follows:

If, as indicated in FIGURES 1 and 2, chain 7 touches the peripheral surface of drum 22, the latter is turned about its axis. Pinions 26 then roll along gear rings 24a to 24c and thereby turn the latter in different directions relative to the stationary gear ring 24c because of their different numbers of teeth. Since the cams of the double clutch which are associated with the clutch members forming the gear rings 24a and 24b have the same pitch direction, only that of these gear rings can take along the inner clutch member 24 and thus the tightening spindle which rotates in the direction in which the cams on member 23 exert their locking action. This locking action of the cams extends in such a direction that the tightening spindle will be turned so as to tighten chain 7 at either direction of rotation of drum 22, and thus also at either direction of travel of the chain. The small difference in the number of teeth of gear rings 24a, 24b, and 24c results in a very great speed reduction between the drum and the tightening spindle and thus in a torque on the latter of a sufficient strength to tighten the chain even though the chain only engages very slightly with the drum.

Figure 5:
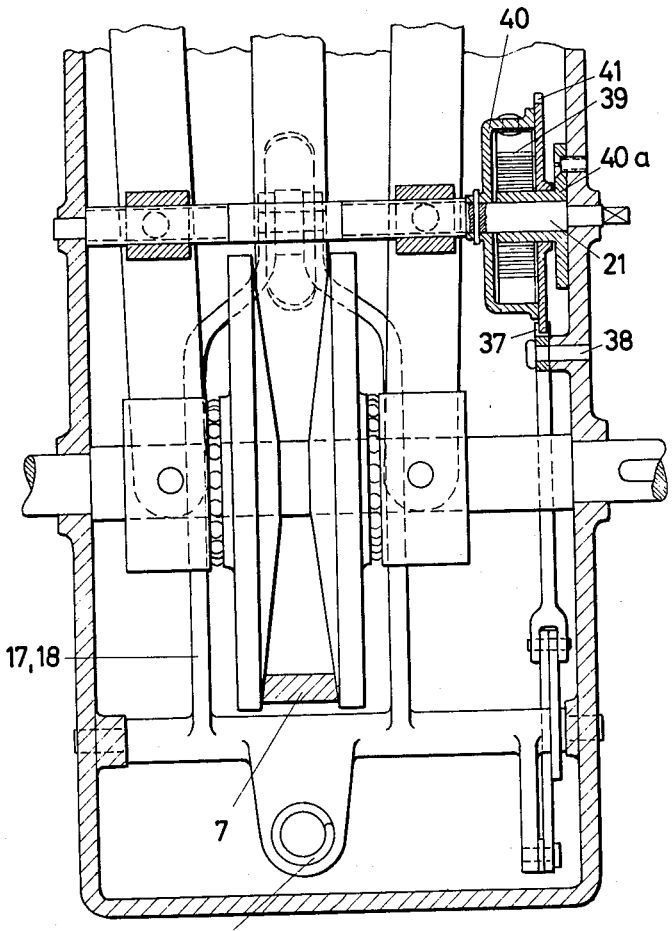
FIGURE 5 shows a section similar to FIGURE 2 of a part of transmission with a chain tightening mechanism according to a modification of the invention.
Figure 6:
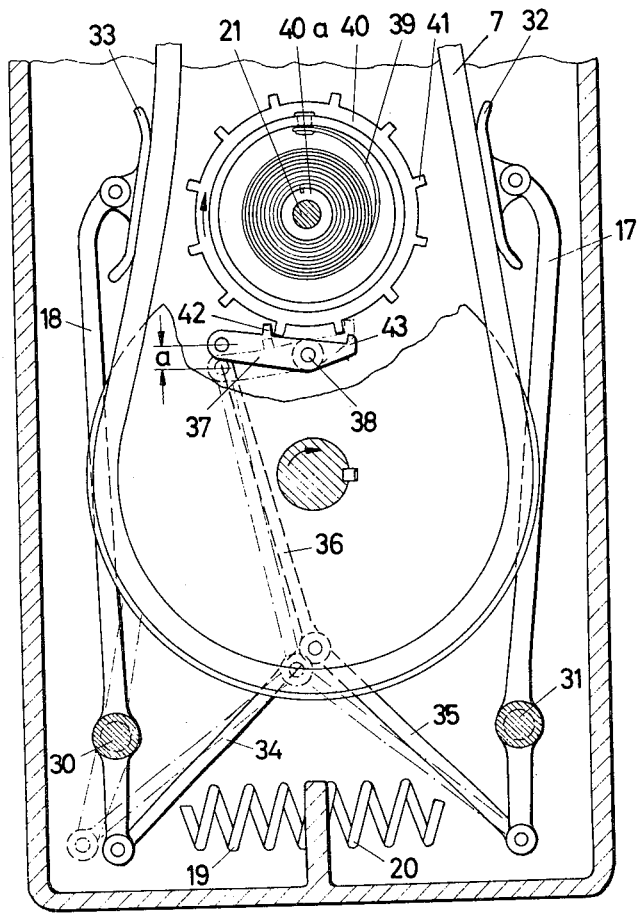
FIGURE 6 shows a section similar to FIGURE 1 of the transmission and chain tightening mechanism according to FIGURE 5.

In the embodiment of the invention as illustrated in FIGURES 5 and 6, the tightening spindle will be turned about a certain angle by a helical spring only when, after the chain has increased to a certain extent in length, the levers which carry the tension shoes have moved so far from their original relative positions that they will actuate an escapement to permit the spring to act upon the spindle. The two tension-shoe levers are indicated in FIGURES 5 and 6 by the same reference numerals 17 and 18 as in FIGURES 1 and 2. Springs 19 and 20 which are tightened when being installed tend to pivot the tension-shoe levers 17 and 18 to such an extent about the pivots 30 and 31 which are fixed to the transmission housing that the tension shoes 32 and 33 will be pressed against the chain 7. The rear ends of both levers 17 and 18 have a pair of arms 34 and 35 pivotably connected thereto, both of which are, in turn, pivotably connected to one end of a draw rod 36 which is pivotably connected at its other end to an anchor escapement 37 which is pivotable about a pin 38 which is secured to the gear housing. A helical spring 39 is wound concentrically around the tightening spindle 21 and its outer end is secured to the spring housing 40 and its inner end to the gear housing by means of a hub 40a. The spring housing 40 which is nonrotatably connected to tightening spindle 21 carries on its outer peripheral surface ratchet teeth 41 which are operatively associated with two teeth 42 and 43 on the escapement 37 so that, whenever the escapement 37 is moved from its neutral position, as shown in full lines, to the position as shown in dot-and-dash lines, the spring housing turns under the action of spring 39 by one tooth in the clockwise direction. This occurs when the tension of the chain has decreased to such an extent that one of the tension shoe levers, for example, the lever 18, is moved to the dot-and-dash line position. This movement is transmitted by one of the arms 34 or 35 to draw rod 36, whereby the connecting point of rod 36 on pawl 37 is shifted for the distance $a$ to the position as shown in FIGURE 6 by dot-and-dash lines. By the rotation of the spring housing under the action of the tightened spring 39, spindle 21 is turned and the chain is tightened in the same manner as described with reference to FIGURES 1 and 2. Tension shoe 33 and its lever 18 are thereby also returned to their original position.

Figure 7:
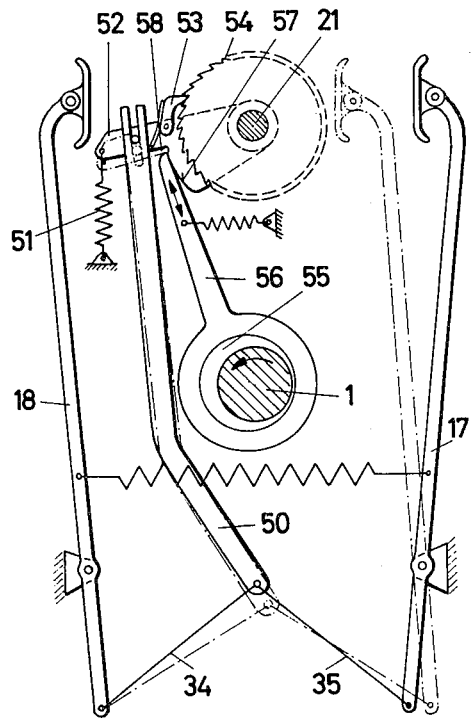
FIGURE 7 shows a diagrammatic illustration of the essential parts of a chain tightening mechanism according to a modification of the mechanism as shown in FIGURE 6.

FIGURE 7 shows a further modification of the invention, in which the rotation of the tightening spindle is caused by the rotation of one of the transmission shafts 1 or 2 rather than by the action of a spring. The tension-shoe levers 17 and 18 and the arms 34 and 35 are of the same design and operate in the same manner as described with reference to FIGURES 5 and 6. In place of the draw rod 36, a push rod 50 is pivotably connected to the common pivot point of arms 34 and 35. The free end of push rod 50 acts upon a pawl carrier 52 which is acted upon by a spring 51 and is freely rotatable on tightening spindle 21. A pawl 53 which is pivotably mounted on pawl carrier 52 engages into a ratchet wheel 54 which is rigidly secured to tightening spindle 21. On transmission shaft 1 an eccentric 55 is secured which is surrounded by the head of an eccentric rod 56 which forms a push rod. When the eccentric 55 revolves on transmission shaft 1, the free end of rod 56 is freely slidable on the back 57 of pawl carrier 52 without moving the same. If the tension of the chain decreases and, as described with reference to FIGURES 5 and 6, the common joint of arms 34 and 35 and of push rod 50 is gradually drawn to the position as shown in dot-and-dash lines, pawl carrier 52 will follow this movement under the action of spring 51, whereby the edge 58 of the pawl carrier gradually enters the range of movement of the reciprocating eccentric rod 56 until the latter will finally pivot the pawl carrier 52 at every stroke in the upward direction against the action of spring 51. When chain 7 has been lengthened to such an extent that push rod 50 will be pulled down to a certain point the size of the pivoting movements of pawl carrier 52 will finally exceed the distance between the adjacent teeth on ratchet wheel 54 so that at every subsequent stroke of rod 56 pawl 53 will drop into the notch of the next tooth and turn the ratchet wheel for the distance of one tooth spacing and thereby also the tightening spindle 21 until the chain is again tightened to such an extent that by the return movement of push rod 50 pawl carrier 52 will no longer be pivoted by the eccentric rod 50. If thereafter the chain is again stretched, the same procedure occurs as above described. Since the pawl or pawl carrier only needs to be actuated very slowly, it is also possible to drive the eccentric 55 or a similar element by means of a worm reduction gear or the like.

Figure 8:
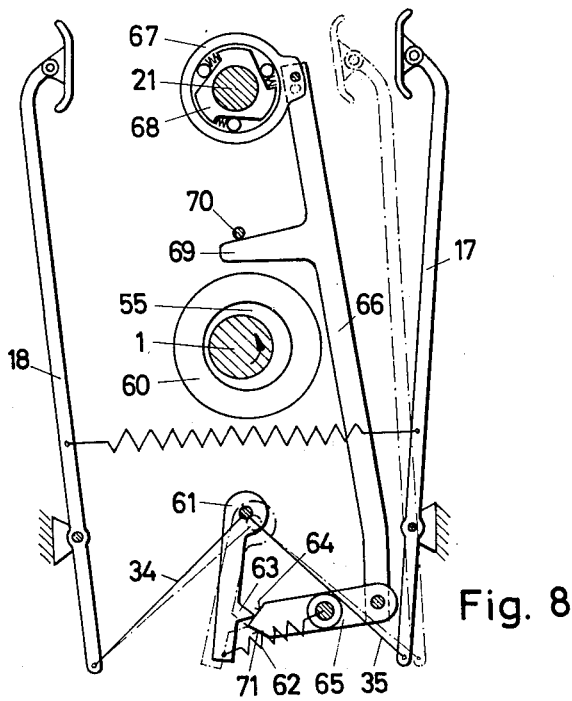
FIGURE 8 shows a diagrammatic illustration similar to FIGURE 7 of the essential parts of a chain tightening mechanism according to a further modification of the invention in the inoperative or rest position.
Figure 9:
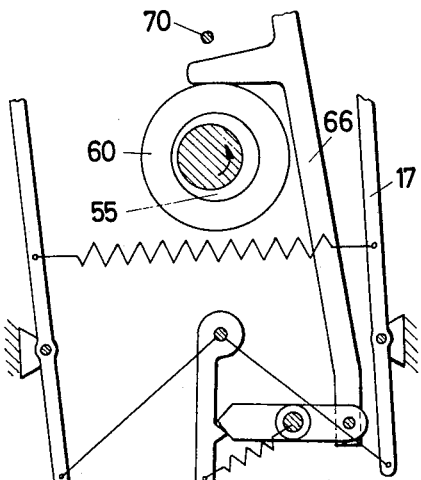
FIGURE 9 shows the mechanism according to FIGURE 8 in the operative position.
Figure 10:
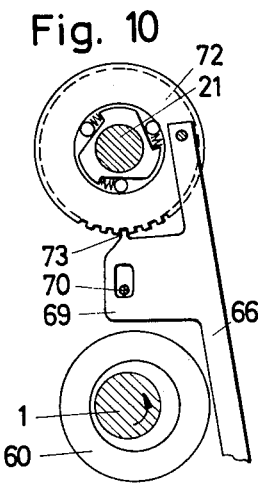
FIGURE 10 shows a modification of a part of the mechanism as illustrated in FIGURES 8 and 9.

The further modification of the invention as illustrated in FIGURES 8 to 10 also operates with an eccentric on one of the transmission shafts, preferably on the drive shaft which runs at a constant speed and with an element which in effect corresponds to the eccentric rod 56 according to FIGURE 7 which is brought into engagement with the eccentric only for a short time during the retightening operation. The actuation of this mechanism is produced by a snap-action switch whereby intermediate positions with very small shifting movements are avoided. In FIGURE 8, the eccentric 55 is again mounted on the gear shaft 1 or on a speed-reduction shaft which is connected thereto. On the eccentric 55 an intermediate ring 60 is mounted so as to be freely rotatable thereon. The tension-shoe levers 17 and 18 and the arms 34 and 35 are of the same design as in FIGURES 5 to 7. Arms 34 and 35 are pivotably connected at their common joint to a lever 61 which has a projection 63 thereon which, by the action of a spring 62, is drawn against a cam surface 64 on one arm of a two-armed lever 65 which is pivotably mounted on a wall of the gear housing. The other arm of lever 65 is pivotably connected to a push rod 66 which, in turn, is pivotably connected at its other end to the outer ring 67 of a grip roller clutch. The inner ring 68 of this clutch is rigidly secured to the tightening spindle 21. A lateral projection 69 on push rod 66 limits the extent of the movement of push rod 66 by its engagement with a pin 70 which is secured to the gear housing. Under the action of spring 62 of the snap-action switch 61 to 65, push rod 66 is held in the position as shown in FIGURE 8 in which the eccentric 55 and the ring 60 are freely rotatable without engaging with the projection 69 of rod 66. If, however, the tension of the chain decreases and one of the tension-shoe levers, for example, lever 17, moves in the direction toward the position as indicated in dot-and-dash lines, the common joint of arms 34 and 35 and of lever 61 slides along the inclined cam surface 64 of lever 65 until it arrives in the position as indicated in dot-and-dash lines in which it comes to the end of surface 64. As soon as the projection 63 passes beyond this point and upon the descending cam surface 71, lever 65 is pivoted in the clockwise direction by the action of spring 62 pressing the projection 63 against the cam surface 71, whereby lever 65 is quickly pivoted to the position as shown in FIGURE 9. In this position, lever 65 draws the push rod 66 into engagement with ring 60 on the eccentric 55 so that the push rod must thereafter follow the movements of the eccentric. It thereby turns the outer ring of clutch 67, 68 first in one and then in the other direction, whereby the tightening spindle 21 is turned so as to tighten the driving chain. When the chain is properly tightened, it returns the tension-shoe lever 17 to its original position, as shown in FIGURE 8. When lever 17 arrives in this position, lever 65 also snaps back to its original position, whereby push rod 66 is withdrawn from the range of movement of the eccentric. This completes the chain tightening operation. The tightening mechanism according to FIGURES 8 and 9 has the advantage that it always remains in engagement only for a short time.

FIGURE 10 illustrates the manner in which on the tightening spindle 21 a ratchet wheel 72 may be rigidly secured into which in the inoperative position of the tightening mechanism a locking tooth 73 on a lateral extension 69 of the push rod 66 may engage in order to prevent an undesired adjustment of the tightening spindle which may occur, for example, if the transmission is subjected to very strong vibrations or jars. As long as the lateral extension 69 remains in engagement with ring 60 on the eccentric, the locking tooth 73 is disengaged from ratchet wheel 72 and allows the tightening spindle to be turned.

Figure 11:
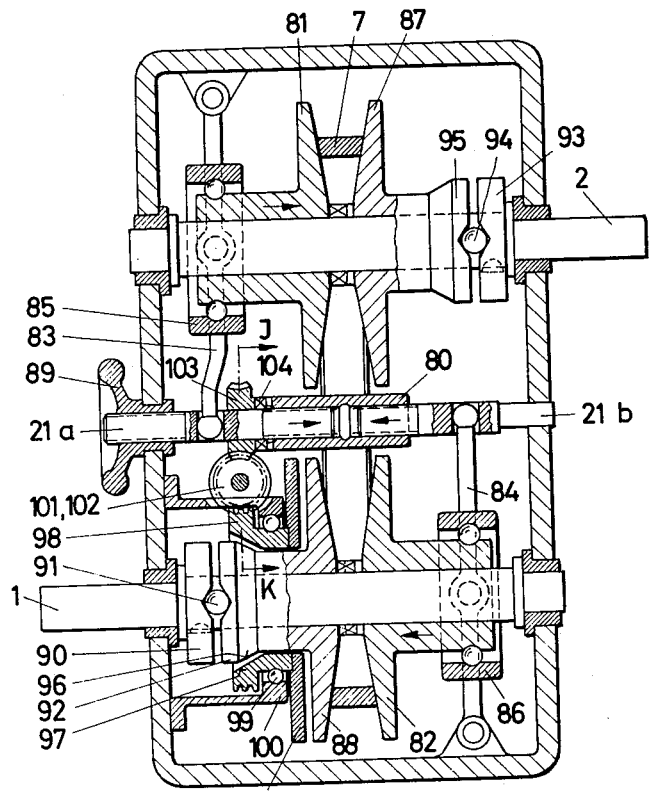
FIGURE 11 shows a section similar to FIGURE 2 of a chain tightening mechanism according to the invention in a transmission in which the conical disks are automatically braced against the chain in proportion to the torque which is applied upon the transmission.
Figure 12:
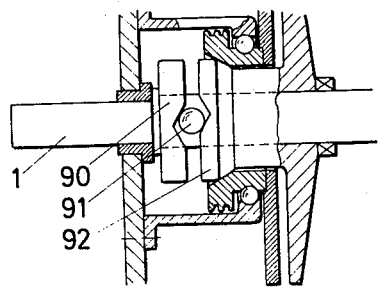
FIGURE 12 shows a detail view of a part of FIGURE 11, but in an operating position different from that as shown in FIGURE 11.
Figure 13:
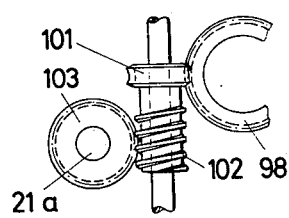
FIGURE 13 shows a detail view of another part of FIGURE 11, as seen along a line I—K in FIGURE 11; while FIGURE 14 finally shows a diagrammatic illustration of still another modification of the chain tightening mechanism according to the invention.

FIGURES 11 to 13 illustrate a further modification of the invention in the form of a chain-tension adjusting mechanism for a transmission in which the conical pulley disks are pressed against the chain automatically in accordance with the torque to which the transmission is subjected. Although in such a transmission any possible extension of the chain will be compensated at least during the operation by the contact pressure which is continuously exerted upon the chain, this still requires the conical disks to be shifted in the axial direction. If the chain is stretched considerably, this shifting of the disks will cause the balls of the contact pressure device to run up on the cam surfaces so that, if the torque direction is suddenly reversed, the chain may become very loose for a short time since the balls of the contact pressure device must then come into engagement with the opposite cam surface.

The tightening spindle of the transmission according to FIGURE 11 is divided into two parts 21a and 21b which are connected with each other by a sleeve 80 which is provided with right-hand and left-hand threads. If this sleeve 80 is turned, the two parts 21a and 21b of the tightening spindle will be adjusted relative to each other in the axial direction. The conical disks 81 and 82 are then shifted by levers 83 and 84 and thrust rings 85 and 86 in the axial direction relative to the conical disks 87 and 88, whereby chain 7 will be tightened or loosened. A turn on the hand wheel 89 results in an axial displacement of tightening spindle 21a, 21b as a unit and thereby in a change in the transmission ratio of the transmission. Transmission shaft 1 carries a pressure ring 90 which is rigidly secured thereto, while a pressure ring 92 is rigidly secured to the conical disk 88. Both pressure rings are provided with cam surfaces between which balls 91 are inserted. The intake torque which is applied upon shaft 1 is transmitted in the conventional manner through the balls 91 to the conical disk 88 and is transformed at the same time into a bearing pressure which is proportional to the intake torque and presses the conical disk 88 against chain 7 and the latter against the conical disk 82. The pressure rings 93 and 95 and the balls 94 on transmission shaft 2 effect in the same manner a bearing pressure which is proportional to the torque which is active on this shaft.

Pressure ring 92 is also provided on the side opposite to that containing the cam surfaces with a conical surface 96 which is associated with a corresponding inner conical surface 97 which is provided in the bore of a worm 98 which is rotatably mounted on the gear housing by means of a ball bearing 99 and a flanged ring 100 so as not to be slidable in the axial direction. Worm 98 meshes with a worm gear 101, as shown in detail in FIGURE 13, which is likewise rotatably mounted on the gear housing. Worm gear 101 is rigidly secured to a further worm 102 which, in turn, meshes with a worm gear 103 on the spindle part 21a. By means of claws 104, worm gear 103 is adapted to be connected to the threaded sleeve 80 so as to be nonrotatable but axially slidable relative thereto.

If in the course of the operation of the transmission the driving chain expands, the conical disks of each pair, that is, 82, 88 and 81, 87, respectively, move more closely toward each other. The cam surfaces and balls then move to the position as illustrated in FIGURE 12, while the pressure ring 92 together with the conical disk 88 moves toward the right. The conical surface 96 then engages with the inner conical surface 97 on worm 98 so that the latter then rotates together with gear shaft 1. This rotation is transmitted by worm gear 101 and worm 102 to the worm gear 103 on the spindle part 21a and further by claws 104 to the threaded sleeve 80. Since the screw threads in the two sides of sleeve 80 and on the two parts 21a and 21b of the tightening spindle have an opposite pitch, the latter will be drawn toward each other, whereby the conical disks 81 and 82 are adjusted by levers 83 and 84 and thrust rings 85 and 86 in such a manner that chain 7 will be retightened. Due to the resistance of the tightening chain, pressure ring 92 and balls 91 are then also returned to their original position, so that the conical surfaces 96 and 97 are again disengaged from each other and the tightening action upon the chain discontinues. By its inertia, a flywheel 105 which is connected to worm 98 then continues the rotation of the worm and thus the tightening movement for a short time and thereby prevents the two conical surfaces from sliding along each other in an intermediate position.

Figure 14:
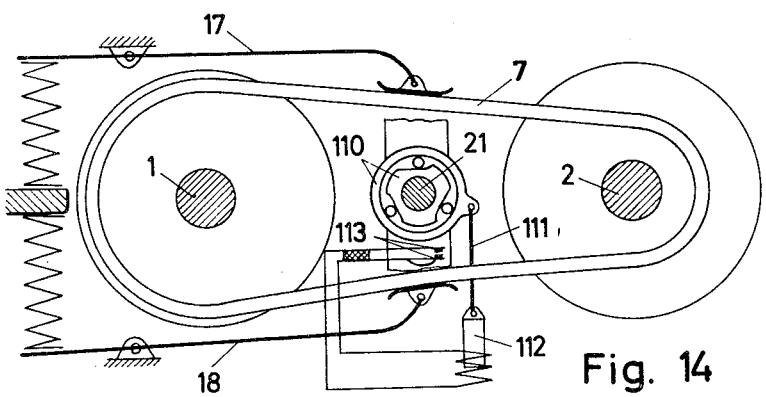

FIGURE 14 diagrammatically indicates the arrangement of the tightening mechanism in connection with an electromagnet. The tightening spindle 21 carries a grip roller clutch 110, the outer ring of which is pivotably connected by connecting rod 111 to the magnet 112. An electrical contact unit 113 which is connected to the winding of magnet 112 is mounted in such a position that the contacts will be closed by chain 7 when it becomes stretched. By the resulting stroke of the armature of the magnet, the tightening spindle is turned through the grip roller clutch about a corresponding angle. At the return stroke of the connecting rod, the tightening spindle 21 is prevented from being taken along by the friction on the threads and bearings of the spindle. The actuation of contacts 113 may also be carried out by one of the tension shoe levers 17 and 18, by the pressure ring 92 as shown in FIGURES 11 and 12, or by any other member, the position of which varies when the tension of the chain decreases. In place of an electromagnet, it is in certain cases also possible to employ a hydraulically or pneumatically actuated piston. In such an event, the contacts 113 are replaced by a valve which is opened by engaging with the gear member which changes its position as the result of the decreasing tension of the chain and thereby permits the pressure medium to flow to and act upon the piston.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an infinitely variable transmission having a housing, including as movable elements a pair of transmission shaft elements rotatably mounted in said housing, two pairs of conical pulley disk elements within said housing and each pair mounted on one of said shafts, and at least one flexible endless power transmitting element connecting said two pairs of disk elements and adapted to travel between them under a certain tension, means for adjusting the axial distances between the disk elements of both pairs equally in opposite directions to each other for varying the transmission ratio of said transmission, means for adjusting the distance between the disk elements of both pairs in the same direction for tightening said transmitting element, said last adjusting means comprising a tightening spindle, threaded means engaging with and movable along said spindle when said spindle is turned, arms connecting said threaded means to a least one disk element of each pair, means for gauging the prevailing tension of said transmitting element and adapted to be moved from one position in accordance with the original tension of said transmitting element to other positions in accordance with said prevailing tension, and means controlled by said gauging means and adapted to be driven by one of the said movable elements of said transmission for turing said tightening spindle when said gauging means indicates that said transmitting element needs to be retightened.

2. In an infinitely variable transmission having a housing, a pair of transmission shafts mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, and arms connecting said threaded means to at least one disk of each pair, tension shoes, and spring means for applying said tension shoes upon and in sliding engagement with one side of each of the driving and loose stringers of said transmitting means, a friction drum rotatably mounted at the other side of said loose stringer and spaced therefrom when said transmitting means has a normal tension, one of said tension shoes being adapted to press said transmitting means into frictional engagement with said drum and thus to rotate said drum when the tension of said transmitting means decreases beyond a certain limit, and means for connecting said drum to said spindle to rotate said spindle to retighten said transmitting means when said drum is rotated by said transmitting means.

3. In an infinitely variable transmission having a housing, a pair of transmission shafts mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, and arms connecting said threaded means to at least one disk of each pair, tension shoes, and spring means for applying said tension shoes upon and in sliding engagement with one side of each of the driving and loose stringers of said transmitting means, a friction drum rotatably mounted at the other side of said loose stringer and spaced therefrom when said transmitting means has a normal tension, one of said tension shoes being adapted to press said transmitting means into frictional engagement with said drum and thus to rotate said drum when the tension of said transmitting means decreases beyond a certain limit, and reduction gear means connecting said drum to said spindle to rotate said spindle at a speed considerably lower than the speed of said drum.

4. In an infinitely variable transmission having a housing, a pair of transmission shafts mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, and arms connecting said threaded means to at least one disk of each pair, tension shoes, and spring means for applying said tension shoes upon and in sliding engagement with one side of each of the driving and loose stringers of said transmitting means, a friction drum rotatably mounted at the other side of said loose stringer and spaced therefrom when said transmitting means has a normal tension, one of said tension shoes being adapted to press said transmitting means into frictional engagement with said drum and thus to rotate said drum when the tension of said transmitting means decreases beyond a certain limit, reduction gear means connected to said drum, and automatic clutch means connecting said gear means to said spindle at either direction of rotation of said drum to rotate said spindle at a speed considerably lower than the speed of said drum and in only one direction in which said spindle effects an increasing tension of said transmitting means.

5. In an infinitely variable transmission having a housing, a pair of transmission shafts mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, and arms connecting said threaded means to at least one disk of each pair, tension shoes, and spring means for applying said tension shoes upon and in sliding engagement with one side of each of the driving and loose stringers of said transmitting means, a friction drum rotatably mounted at the other side of said loose stringer and spaced therefrom when said transmitting means has a normal tension, one of said tension shoes being adapted to press said transmitting means into frictional engagement with said drum and thus to rotate said drum when the tension of said transmitting means decreases beyond a certain limit, said drum being rotatably mounted on said spindle and enclosing a planetary gear, planet pinions within and rotatably mounted on said housing, a first sun wheel rotatably mounted on said spindle but nonrotatably connected to said gear housing and meshing with said planet pinions, a pair of gears together forming a second sun wheel also meshing with said planet pinions and freely rotatable on said spindle, and clutch means connecting said pair of gears to said spindle so as to rotate said spindle in only one direction in which said spindle effects an increasing tension of said transmitting means, one of said gears having a slightly smaller and the other gear a slightly larger number of gear teeth than said first sun wheel.

6. In an infinitely variable transmission having a housing, a pair of transmission shafts mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, and arms connecting said threaded means to at least one disk of each pair, tension shoes, and spring means for applying said tension shoes upon and in sliding engagement with one side of each of the driving and loose stringers of said transmitting means, a friction drum rotatably mounted at the other side of said loose stringer and spaced therefrom when said transmitting means has a normal tension, one of said tension shoes being adapted to press said transmitting means into frictional engagement with said drum and thus to rotate said drum when the tension of said tranmsitting means decreases beyond a certain limit, said drum being rotatably mounted on said spindle and enclosing a planetary gear, planet pinions within and rotatably mounted on said housing, a first sun wheel meshing with said planet pinions and having a hub forming a hollow shaft surrounding and rotatably mounted on said spindle, and axially slidable means for connecting said hub to one of said threaded means on said spindle carrying said arms, a pair of gears together forming a second sun wheel also meshing with said planet pinions and freely rotatable on said spindle, and clutch means connecting said pair of gears to said spindle so as to rotate said spindle in only one direction in which said spindle effects an increasing tension of said transmitting means, one of said gears having a slightly smaller and the other a slightly larger number of gear teeth than said first sun wheel.

7. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, arms connecting said threaded means to at least one disk of each pair, a pair of levers, tension shoes mounted on said levers, spring means acting on said levers for applying said tension shoes upon and in sliding engagement with one side of each stringer of said transmitting means for gauging the prevailing tension of said transmitting means, driving means connected to and actuated by one of said transmission shafts for rotating said spindle to retighten said transmitting means, and control means connected to said levers for connecting said driving means to said transmission shaft when one of said levers and the tension shoe thereon reaches a position indicating that said transmitting means needs to be retightened.

8. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, arms connecting said threaded means to at least one disk of each pair, a pair of levers, tension shoes mounted on said levers, spring means acting on said levers for applying said tension shoes upon and in sliding engagement with one side of each stringer of said transmitting means for gauging the prevailing tension of said transmitting means, clutch means on said spindle adapted when turned in one direction to engage with and to turn said spindle to tighten said transmitting means, driving means connected to and driven by one of said transmission shafts and adapted to carry out a reciprocating movement, connecting means connected to said driving means for intermittently acting upon said clutch means to rotate said spindle in a step-by-step movement in said direction, and control means connected to said levers for connecting said connecting means to said driving means when one of said levers and the tension shoe thereon reaches a position indicating that said transmitting means needs to be retightened.

9. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, arms connecting said threaded means to at least one disk of each pair, a pair of levers, tension shoes mounted on said levers, spring means acting on said levers for applying said tension shoes upon and in sliding engagement with one side of each stringer of said transmitting means for gauging the prevailing tension of said transmitting means, a ratchet gear comprising a ratchet wheel secured to said spindle and adapted when turned in one direction to turn said spindle, a pawl carrier pivotably mounted on said spindle, a pawl pivotaly mounted on said pawl carrier and engaging with said ratchet gear, driving means connected to and driven by one of said transmission shafts and adapted to carry out a reciprocating movement and adapted to engage with said pawl carrier to pivot the same intermittently to turn said spindle in one direction, a spring connected to said pawl carrier to pivot the same in the direction toward said driving means, and a stop member connected to said levers and to said pawl carrier for maintaining said pawl carrier in a position in which it is not pivoted by said driving means when said transmitting means is under a normal tension and for allowing said pawl carrier to be moved under the action of its spring toward said driving means so as to be reciprocated thereby when one of said levers and the tension shoe thereon reaches a position indicating that said transmitting means needs to be retightened.

10. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, means for adjusting the axial distances between the disks of both pairs equally in opposite directions to each other for varying the transmission ratio of said transmission, means for adjusting the distance between the disks of both pairs in the same direction for tightening said transmitting means, said last adjusting means comprising a tightening spindle, threaded means engaging with and movable along said spindle when said spindle is turned, arms connecting said threaded means to at least one disk of each pair, a pair of levers, tension shoes mounted on said levers, spring means acting on said levers for applying said tension shoes upon and in sliding engagement with one side of each stringer of said transmitting means for gauging the prevailing tension of said transmitting means, clutch means on said spindle adapted when turned in one direction to engage with and to turn said spindle to tighten said transmitting means, an eccentric mounted on and driven by one of said transmission shafts for producing a reciprocating movement, a connecting rod adapted to be connected to said eccentric for intermittently acting upon said clutch means to rotate said spindle in a step-by-step movement in said direction, and control means comprising a snap-action switch having a spring and in its first position when said transmitting means is sufficiently tight maintaining said connecting rod out of engagement with said eccentric and adapted to be moved by at least one of said levers to a second position in which under the action of its spring said switch moves said connecting rod quickly into engagement with said eccentric to retighten said transmitting means when said lever and the tension shoe thereon are moved by said transmitting means to a position indicating that said transmitting means needs to be retightened, said switch being further adapted under the action of its spring to return quickly from said second position to said first position when said transmitting means has been sufficiently retightened.

11. In an infinitely variable gear as defined in claim 10, in which a ratchet wheel is secured on said tightening spindle, said connecting rod having locking means thereon engaging with the teeth of said ratchet wheel so as to lock said spindle against unintentional rotation when said connecting rod is disengaged from said eccentric.

12. In an infinitely varible transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, torque responsive means for producing an axial force proportional with the torque acting upon said shafts for bracing the first disk of each pair relative to said transmitting means and the second disk of said pair, means for adjusting the disks of both pairs in the same direction for tightening said transmitting means, said last adjusting means comprising a tightening spindle and means connecting said spindle to the second disk of each pair, a friction clutch having two members movable relative to each other, the first clutch member being secured to said first disk of one of said pairs and adapted to be moved into engagement with the second clutch member when said first disk is axially shifted by said torque-responsive means out of its normal position when the tension of said transmitting means has decreased to a certain limit, and a reduction gear interposed between and connecting said second clutch member to said spindle.

References Cited in the file of this patent
UNITED STATES PATENTS

| | | |
|---|---|---|
| 2,112,157 | Hatcher | Mar. 22, 1938 |
| 2,266,687 | Keller | Dec. 16, 1941 |